United States Patent [19]

Mathur et al.

[11] Patent Number: 6,063,864
[45] Date of Patent: May 16, 2000

[54] CURABLE, UNSATURATED POLYESTER COMPOSITIONS

[75] Inventors: Arvind M. Mathur, Wayne; James A. Dougherty, Pequannock, both of N.J.

[73] Assignee: ISP Investments Inc., Wilmington, Del.

[21] Appl. No.: 09/064,210

[22] Filed: Apr. 22, 1998

[51] Int. Cl.[7] .................................................. C08L 67/06
[52] U.S. Cl. ................................................ 525/44; 525/49
[58] Field of Search ......................................... 525/44, 49

[56] References Cited

U.S. PATENT DOCUMENTS 5,360,863  11/1994  Meixner ..................................... 525/28
5,536,760   7/1996  Friedlander ............................... 522/96

OTHER PUBLICATIONS

Bjorksten, J, *Polyesters and Their Applications*, p. 168 Reinhold Publishing Corp. N.Y (1960).

*Primary Examiner*—Patricia A. Short
*Attorney, Agent, or Firm*—Walter Katz; William J. Davis; Marilyn J. Maue

[57] ABSTRACT

A curable, unsaturated polyester composition comprising, by weight, an unsaturated polyester and 1–60% styrene and 1–50% vinylether monomers.

3 Claims, No Drawings

CURABLE, UNSATURATED POLYESTER COMPOSITIONS

BACKGROUND OF THE INVENTION

1. Field of the Invention

This invention relates to compositions curable by radical, cationic or radical/cationic polymerization initiated by light, electron beam or chemical initiators, and more particularly, to olefinically unsaturated polyester, styrene and vinylether formulations, and to their use for the production of coatings, patching or sealing compositions or for the production of neat or fiber-filled molded articles.

2. Description of the Prior Art

Formulations based on unsaturated polyesters (UPEs) containing styrene are used primarily in the manufacture of fiberglass-reinforced plastics (FRP) which find application in the construction, marine, and automotive industries. Non-fiber-filled UPE formulations are used to make gel-coats, automotive repair putty, synthetic marble, and UV curable coatings. Typically, unsaturated polyester resins (UPERs) are formulated with styrene as a comonomer which serves the dual purpose of lowering viscosity and acting as a crosslinking agent during cure. UPERs available in the market today usually contain between 30–50% styrene. However, an environmental issue facing such UPE manufacturers is the regulation of styrene emissions. Styrene has a relatively high volatility which results in its being released from both uncured resins at room temperature and at much higher rates during cure. The Environmental Protection Agency (EPA) included styrene in its Toxic Release Inventory (TRI) in 1987 and classifies it as a possible carcinogen. Organizations such as the Occupational Safety and Health Administration (OSHA) and the Clean Air Act Amendments (CAAA) have included styrene in a list of volatile organic compounds to which exposure should be limited. Accordingly, UPE manufacturers have considered using different monomers to replace styrene in applications that can result in considerable exposure to styrene monomer.

Vinylethers (VEs) are electron-rich monomers that can undergo rapid cationic homopolymerization as well as free-radical charge-transfer polymerization with electron deficient moieties such as maleates or fumarates present in typical UPEs. A majority of vinylethers are relatively safe to handle and are non-toxic alternatives to styrene. Vinylethers have attributes similar to styrene in terms of providing diluency and high reactivity with UPEs. Thus VEs may be used in conjunction with styrene to reduce emissions in applications where lowering of toxic emissions is desirable.

For example, vinylethers can be used with unsaturated polyesters to provide UV curable coatings. WO 90701512 describes UPE-VE coating formulations consisting of a 1:1 molar ratio of vinylether to UPE unsaturated groups which are cured using UV light and a suitable photoinitiator for use in metal coatings, dental products, glass laminates and stereolithography. Various vinylether monomers, both monofunctional as well as bifunctional, also have been mentioned as the VE component of such systems. Similarly, EP 0322808 A2 discloses liquid radiation curable compositions containing an unsaturated polyester component with compounds containing at least two vinylether groups.

WO 9748744 describes curable polyester compositions in which the polyester and/or comonomer is terminated with at least one bulky and/or hydrogen donating monofunctional alcohol.

U.S. Pat. No. 5,360,863 discloses the use of UPEs with vinylether and/or (meth)acryloyl groups as radiation curable or peroxide curable compositions for use as binders for coating, patching or sealing compositions and for the production of molded articles. Research Disclosure December 1994 Number 36846 disclosed a copolymer of VE with UPE in a 1:1 alternating structure. However, none of these references disclose, teach or suggest a system in which styrene (or its derivatives) is partially replaced by vinylethers as a comonomer to lower toxic emissions at a reasonable cost.

DESCRIPTION OF THE INVENTION

This invention discloses formulations based on unsaturated polyesters containing between 1–60 parts styrene (or currently used derivatives) and 1–80 parts vinylether groups and free-radical or a combination of free-radical and cationic initiators which may be cured with heat, ionizing radiation, light or peroxides. Such formulations find use in diverse industries such as coatings, marine, architectural, automotive, and consumer articles. Suitable formulations, by weight, contain the following:

(A) Unsaturated polyester with ethylenically unsaturated groups, preferably a maleate or fumarate;

(B) Styrene, methyl methacrylate, vinyl toluene, para-methylstyrene, or other styrene derivatives (1–60%);

(C) Vinylether monomers or a vinylether functional oligomer possessing one or more of the following functional groups $CH_2=CH-O-$ (1–80%);

(D) Initiator, free-radical or cationic (or both), and;

(E) Additives and fillers (0–50%).

Suitable unsaturated polyesters (A) are made by polycondensation of saturated and unsaturated dibasic carboxylic acids or anhydrides with glycols and hydrocarbon modifiers. The saturated dibasic acids include phthalic anhydride, isophthalic acid, adipic acid, and chlorendic anhydride, while the unsaturated dibasic acids include maleic anhydride and fumaric acid. Examples of suitable glycols include propylene glycol, diethylene glycol, dipropylene glycol, ethylene glycol, and neopentyl glycol. Hydrocarbon modifiers such as dicyclopentadiene also may be incorporated into the unsaturated polyester.

Suitable reactive monomers (B) include styrene, para-methylstyrene, vinyl-toluene, para-methyltoluene, butyl-toluene, methyl methacrylate, and hydroxypropyl methacrylate.

Typical vinylether components (C) of the formulation includes ethylvinylether (EVE), n-propyl vinylether, iso-propyl vinylether, n-butyl vinylether (n-BVE), iso-butyl vinylether (i-BVE), cyclohexyl vinylether (CVE), hydroxybutyl vinylether (HBVE), cyclohexanedimethanol divinylether (CHVE), triethyleneglycol divinylether (DVE-3), butanediol divinylether (DVB1D), cyclohexanedimethanol monovinylether (CHMVE), diethyleneglycol divinylether (DVE-2), 2-ethylhexyl vinylether (EHVE), dodecyl vinylether (DDVE), octadecyl vinylether (ODVE), hexanediol divinylether (HDDVE), dipropyleneglycol divinylether (DPE-2) and tripropyleneglycol divinylether (DPE-3).

The systems of the invention are cured by a free-radical mechanism or by a combination of free-radical and cationic mechanisms. The styrene monomer homopolymerizes by a free-radical mechanism as well as copolymerizes with the unsaturated polyester acting as a crosslinker. Vinylethers and unsaturated polyesters copolymerize in a 1:1 molar ratio in strictly alternating fashion via a free-radical initiated charge-transfer polymerization. Accordingly, a thermal, photo- or peroxide (with metal salts) initiators (D) may be employed. Thermally decomposable initiators also may be employed such as acyl peroxides e.g. acetyl and benzoyl peroxides; alkyl peroxides such as cumyl and t-butyl peroxides; hydroperoxides such as cumyl and t-butyl hydroperoxides; and azo compounds such as 2,2'-azobisisobutyronitrile (AIBN). Free-radical photoinitiators include benzophenone, benzoin ethers, hydroxy or alkoxy-functional acetophenone derivatives or phosphine oxide derivatives. Metal salt decomposable peroxide initiators capable of generating free-radicals at room temperature also may be used such as methyl ethyl ketone peroxide, and cyclohexanone peroxide. The metal salts used to decompose these peroxides at room temperature usually are salts of cobalt such as cobalt octoate.

When light is used to initiate the polymerization at room temperature, it is desirable to use a photosensitizer to increase absorption of light of an appropriate wavelength, which then may be transferred to the photoinitiator. Such compounds include benzophenone, anthraquinone and thioxanthones. In addition, if an accelerated cure of the vinylether is desired, small amounts of a cationic photoinitiator should be present to facilitate cationic homopolymerization of the vinylether. Examples of suitable cationic photoinitiators are triarylsulphonium or diaryliodonium salts with counterions such as, hexafluorophosphate, hexafluoroanitmonate and tetrafluoroborate. When present, these cationic photoinitiators are sources of both free-radicals as well as cations.

Thermal cure of a formulation also may be carried out by heating the formulation to a temperature at which the thermal initiator decomposes to liberate free-radicals. If peroxide cure at room temperature is required, metal salts or radiation cure by UV/visible light or electron beam may be used.

When light is used to fragment a photoinitiator, it may be UV light (200–400 nm) or visible light (400–800 nm). Sources of UV/visible light may be mercury arc lamps, electrodeless lamps such as sold by Fusion Inc., or laser sources producing light of a very narrow wavelength distribution. An electron beam source produces ionizing radiation that may be sufficient in energy to result in cleavage of an unsaturated double bond without the presence of any initiator. Such devices produce electron beams with the energy of the accelerated electrons in the range of 100 KeV to 300 KeV.

The choice of an initiation scheme will solely depend on the nature of the finished product. For example, for a coating application UV/Visible/e-beam curing may be desired while for the production of laminates and molded objects peroxide cure initiated by heat or metal salts would be appropriate.

An additive (E) which promotes stability of the formulation is an inhibitor that prevents premature reaction of the components. Suitable inhibitors are hydroquinone and its derivatives which generally are used at levels of 50–200 ppm. Fiberglass may be used as a filler in the fabrication of fiberglass-reinforced plastics in levels ranging from 5–40%. Other additives, present in typically <5% levels may include surfactants, waxes, matting agents, stabilizers, pigments, and dyes.

The formulation also may contain additives such as pigments or dyes. However, such additives should not absorb in the region in which the photoinitiators themselves absorb light. Flatting agents or fillers such as silica, titanium dioxide, talc, calcium carbonate and silicates may be present. For fiber-reinforced plastics, glass fibers such as chopped or powdered e-glass fibers or woven mattes and preforms, may be used to impart mechanical strength.

The formulations of this invention are used to fabricate molded parts, or as coatings applied to substrates such as wood, metal, glass, plastics and paper by known methods such as spraying, roll coating, blade coating, gravure coating, spin coating, and the like.

The advantage of this invention resides in a substantial reduction in toxic emissions of styrene and other volatile toxic materials. Partial replacement of styrene herein in UPE formulations by relatively non-toxic vinylethers represents a significant reduction in toxic emissions before and during cure. This advantage is important in such applications as UV curing, hand lay-up and open-mold operations such as boat-hull manufacture, and automotive repair putties where styrene emissions are potentially harmful. In this invention, formulations of vinylethers with only small quantities of styrene provides a product which has a viscosity comparable to a styrene formulation. Such formulations are described hereinafter.

EXAMPLES 1–6

The following examples 1–6 demonstrate the advantages of replacing styrene with a vinylether in an unsaturated polyester (UPE) formulation. Example 1 demonstrates the effectiveness of triethyleneglycol divinylether (DVE-3) in lowering the amount of styrene emitted in room temperature peroxide cured UPE/styrene/DVE-3 formulations. Example 2 compares the reactivity of these formulations as evidenced by their SPI gel time, cure time and peak exotherm. Example 3 presents the comparative hardness of these cured formulations. Example 4 shows the effect of the initiating components on hardness. Example 5 illustrates the effectiveness of cyclohexanedimethanol divinylether (CHVE) in producing polymers of increased hardness. Example 6 shows the useful mechanical properties of the cured formulations of Example 1.

Example 1

Formulations based on a 65/35 by weight of UPE resin-to-diluent ratio were compared to demonstrate the effectiveness of DVE-3 in lowering styrene emissions during room temperature peroxide cure. The samples contained increasing amounts of DVE-3, which replaced styrene, ranging from a 65/35/0 (UPE/styrene/DVE-3) composition to a 65/0/35 formulation. Each of these formulations contained 100 ppm of hydroquinone as a stabilizer. A 100 g sample was initiated by blending an initiator system comprising 1.0 wt. % methyl ethyl ketone peroxide (MEKP), 0.3 wt. % cobalt naphthanate (6% Co) and 0.15 wt. % dimethylaniline (DMA) into the formulation. The weight loss studies* were carried out by pouring the sample into an aluminum dish (diameter of ~14 cm) placed on a balance. The loss in weight (in grams) during curing was recorded after 24 hours. Table 1 shows the weight loss for various formulations using Polylite® X3243-88-8 as the UPE.

Polylite®—Reichhold Chemicals, USA.

* The weight loss studies were performed using the method of the South Coast Air Quality Management District of California's Rule 1162.

TABLE 1

| UPE/STYRENE/DVE-3 (wt. %) | WEIGHT LOSS (%) |
|---|---|
| 65/35/0 (Control) | 1.33 |
| 65/30/5 | 0.86 |

TABLE 1-continued

| UPE/STYRENE/DVE-3 (wt. %) | WEIGHT LOSS (%) |
|---|---|
| 65/25/10 | 0.78 |
| 65/20/15 | 0.75 |
| 65/15/20 | 0.63 |
| 65/0/35 | 0.10 |

The data in Table 1 demonstrates that replacing styrene in the control formulation with DVE-3 results in a substantial decrease in weight loss of monomers during curing.

Example 2

The SPI (Society of Plastics Industry) gel time test involves determining the gel time, cure time and peak temperature for a formulation catalyzed with 1% benzoyl peroxide maintained at 180° F. (82.2° C.) in a water bath. The gel time is defined as the time required to go from 150° to 190° F. The cure time is defined as the time from 190° F. to the peak temperature (the total time to peak is the sum of the two), and peak temperature (or exotherm) is the maximum temperature attained by the sample during cure. These parameters are a representation of the lead time, reactivity and rate of cure for any curable formulation.

Table 2 shows the SPI gel time, cure time and peak exotherm for UPE/styrene/DVE-3 formulations using Polylite® as the UPE.

TABLE 2

| UPE/Styrene /DVE-3 (wt. %) | SPI Gel Time (mm:ss) | Cure Time (mm:ss) | Total Time-to-Peak (mm:ss) | Peak Exotherm (° C.) |
|---|---|---|---|---|
| 65/35/0 (Control) | 04:23 | 03:35 | 07:58 | 216.61 |
| 65/25/10 | 04:37 | 04:03 | 08:40 | 195.80 |
| 65/20/15 | 04:59 | 04:16 | 09:15 | 184.16 |
| 65/15/20 | 05:36 | 04:36 | 10:12 | 171.10 |
| 65/0/35 | 05:30 | 01:39 | 07:09 | 180.56 |

The data shows that replacement of styrene with DVE-3 results in a slight increase in gel time but a greater decrease in cure time, and a decrease in the peak exotherm. Accordingly, the reactivity of the invention formulations is comparable to the UPE/styrene control sample.

Example 3

The surface hardness of the cured formulations of Example 1 was measured according to ASTM test D-2583 using a Barcoal impressor. Prior to testing, the samples were placed in an oven at 75° C. for 24 hours in order to determine the ultimate properties of the cured polymers. The following table shows the hardness results for the samples described in Example 1.

TABLE 3

| UPE/Styrene/DVE-3 (wt %) | Barcoal Hardness |
|---|---|
| 65/35/0 | 39 |
| 65/25/10 | 30 |
| 65/20/15 | 23 |
| 65/15/20 | 8 |
| 65/0/35 | 0 |

The above results demonstrate that the replacement of styrene with DVE-3 decreases the ultimate hardness of the cured material and hence would introduce greater flexibility.

Example 4

Example 1 was repeated using DRI-RX (OMG Mooney Chemicals) instead of dimethyl aniline (DMA) as the accelerator and cobalt Ten-Cem® (OMG Mooney Chemicals) instead of cobalt naphthanate for curing the 65/25/10 formulation. The product had an increased Barcoal hardness of 38 compared to 30 using DMA and cobalt naphthanate under the same curing conditions.

Example 5

Example 1 was repeated using cyclohexane dimethanol divinylether (CHVE) in place of DVE-3 in a 65/25/10 UPE/styrene/CHVE composition. The monomer weight loss was only 0.94 wt. % and the Barcoal hardness was increased to 38 after 24 hours in an oven maintained at 75° C. (compared to a hardnes of 30 obtained for the corresponding DVE-3 formulation).

Example 6

The mechanical properties of the products of Example 1 were measured in accordance with standard ASTM tests for tensile strength (D-638), tensile modulus (D-638), % elongation (D-638), and flexural modulus (D-790). The samples were cured in appropriate molds based on the room temperature peroxide cure procedure described in Example 1. The results are shown in Table 4 below.

TABLE 4

| Formulation (UPE/Styrene /DVE-3) | % Strain at Yield | Tensile Strength (psi) | Young's Modulus (psi) | Flexural Stress at Yield (psi) | Flexural Modulus (psi) |
|---|---|---|---|---|---|
| 65/35/0 (Control) | 1.28 | 1060 | 87000 | 4850 | 233000 |
| 64/25/10 | 4.12 | 576 | 27600 | 4820 | 190000 |
| 65/20/15 | 3.11 | 1540 | 62400 | 4200 | 94700 |
| 65/15/20 | 2.63 | 960 | 40700 | 6800 | 137000 |
| 65/0/35 | 5.25 | 756 | 18900 | 8370 | 190000 |

The data demonstrates that successive replacement of styrene with DVE-3 results in an increase in flexibility as evidenced by an increase in flexural stress at yield, an increase in % elongation, and hence a decrease in tensile modulus.

Accordingly, the formulations of the invention, in which styrene is partially replaced with vinylether reduces styrene monomer emissions during cure, and can introduce the feature of flexibility into otherwise hard UPE polymers by selection of an appropriate vinylether. However, if hardness is desired, it may be obtained by an appropriate choice of the vinylether and the initiating components. Perhaps the greatest advantage of using vinylethers for partial styrene replacement in UPE resins is the ability of small amounts of the vinylether to decrease monomer loss during cure.

The curable formulation may be cured by a free radical initiator, at room temperature, by a cationic mechanism, or mixtures thereof, or by UV or e-beam irradiation. The cured product finds application in many industries including but not limited to fabricated molded parts, gel coats, fiberglass composites, structural components, or coatings applied to substrates such as wood, metal, glass, plastics and paper by spraying, roll coating, blade coating, gravure coating, spin coating and the like.

While the invention has been described with particular reference to certain embodiments thereof, it will be understood that changes and modifications may be made which are within the skill of the art. Accordingly, it is intended to be bound only by the following claims, in which:

What is claimed is:

1. A curable, unsaturated polyester composition consisting essentially of, by weight, an unsaturated polyester, 5–30% styrene and 5–30% vinylether monomers.

2. A composition according to claim 1 in which the vinylether is triethyleneglycol divinylether or cyclohexanedimethanol divinylether.

3. A cured product of claims 1 or 2.

* * * * *